US 7,134,078 B2

(12) United States Patent
Vaarala

(10) Patent No.: US 7,134,078 B2
(45) Date of Patent: Nov. 7, 2006

(54) HANDHELD PORTABLE USER DEVICE AND METHOD FOR THE PRESENTATION OF IMAGES

(75) Inventor: Jani Vaarala, Oulu (FI)

(73) Assignee: Nokia Corporation, Espoo (FI)

( * ) Notice: Subject to any disclaimer, the term of this patent is extended or adjusted under 35 U.S.C. 154(b) by 395 days.

(21) Appl. No.: 10/122,496

(22) Filed: Apr. 11, 2002

(65) Prior Publication Data

US 2003/0030622 A1 Feb. 13, 2003

(30) Foreign Application Priority Data

Apr. 18, 2001 (GB) ................................ 0109532.2

(51) Int. Cl.
*G06F 3/033* (2006.01)
(52) U.S. Cl. .................... 715/730; 715/732; 715/856; 715/864; 345/157; 345/158
(58) Field of Classification Search ............... 345/835, 345/760, 762, 157, 158, 156, 180, 181, 2.1, 345/2.3, 1.2, 3.1; 715/730, 732, 864, 856, 715/862, 863, 835, 760, 762
See application file for complete search history.

(56) References Cited

U.S. PATENT DOCUMENTS

| 4,171,881 A | 10/1979 | Lewis ......................... 352/72 |
| 4,396,262 A | 8/1983 | Laizans et al. ............... 353/43 |
| 4,739,396 A | 4/1988 | Hyatt ......................... 358/60 |
| 5,233,375 A | 8/1993 | Williams et al. ............. 353/43 |
| 5,515,079 A | 5/1996 | Hauck ........................ 345/157 |
| 5,572,251 A | 11/1996 | Ogawa ....................... 348/207 |
| 5,712,658 A | 1/1998 | Arita et al. ................. 345/158 |
| 5,769,684 A | 6/1998 | Lou ............................ 446/219 |
| 5,782,548 A * | 7/1998 | Miyashita .................... 353/42 |
| 5,822,021 A | 10/1998 | Johnson et al. ............. 348/742 |
| 5,914,783 A | 6/1999 | Barrus ........................ 356/375 |
| 6,186,630 B1 * | 2/2001 | Miyashita .................... 353/42 |
| 6,275,214 B1 * | 8/2001 | Hansen ....................... 345/158 |
| 6,323,839 B1 * | 11/2001 | Fukuda et al. .............. 345/157 |
| 6,346,933 B1 * | 2/2002 | Lin ............................. 345/157 |
| 6,531,999 B1 * | 3/2003 | Trajkovic ................... 345/157 |
| 6,545,664 B1 * | 4/2003 | Kim ........................... 345/158 |
| 6,637,896 B1 | 10/2003 | Li et al. ..................... 353/119 |

(Continued)

FOREIGN PATENT DOCUMENTS

EP 0690409 A1 1/1996

(Continued)

OTHER PUBLICATIONS

Kirstein. Carsten. et al.; "Interaction with a projection screen using a camera-tracked laser pointer"; Informatik VII (Computer Graphics): University of Dortmund. D-44221 Dortmund. Germany: http://1s7-www.informatik.uni-dortmund.de: 2 pages.

*Primary Examiner*—Raymond J. Bayerl
(74) *Attorney, Agent, or Firm*—Alston & Bird LLP

(57) ABSTRACT

A presentation system and a user device for use as a presentation aid is disclosed. The system comprises presentation means (5) for presenting images that associate with a presentation. Pointer means (4) are used for provision of a pointer on an image (11) presented by means of the presentation means. Detector means (8) are for detecting the pointer on the image and for determining the location of the pointer relative to the image. Control means (6) are adapted to provide at least one control function for the presentation based on information from the detector means.

28 Claims, 3 Drawing Sheets

U.S. PATENT DOCUMENTS

| | | | |
|---|---|---|---|
| 6,727,885 B1* | 4/2004 | Ishino et al. | 345/156 |
| 6,734,847 B1* | 5/2004 | Baldeweg et al. | 345/419 |
| 6,806,850 B1 | 10/2004 | Chen | 345/7 |
| 6,814,444 B1 | 11/2004 | Miyashita | 353/42 |
| 6,832,724 B1 | 12/2004 | Yavid et al. | 235/454 |
| 2001/0030668 A1* | 10/2001 | Erten et al. | 345/863 |
| 2002/0089489 A1* | 7/2002 | Carpenter | 345/158 |

FOREIGN PATENT DOCUMENTS

| | | |
|---|---|---|
| EP | 0718748 A2 | 6/1996 |
| EP | 0947948 | 10/1999 |

* cited by examiner

Display an image that associates with a presentation on a screen

↓

Produce a detectable mark on the screen by a pointer device

↓

Determine information regarding the location of the mark relative to the image by means of imaging means

↓

Control the presentation based on said information

HANDHELD PORTABLE USER DEVICE AND METHOD FOR THE PRESENTATION OF IMAGES

FIELD OF THE INVENTION

The present invention relates to presentation of images and more particularly to control operations associated with such presentations.

BACKGROUND OF THE INVENTION

Various presentations may need to be given in different occasions. For example, a person may need to give a speech, an introduction or a lecture or to comment something and so on. A person giving a presentation will be referred to in this specification as a presenter.

The presenter may use various technical devices to, for example, visualise the matter he or she is talking about e.g. by means of slides or similar illustrations. The various visualising illustrations will be referred to herein by the term image. An image may be displayed by projecting the image on an appropriate surface by a projecting device. For example, the image may be projected on a surface such as screen or wall. A display of a TV screen type device may also be used for displaying an image. The image presentation means may include devices such as overhead projectors, video guns or screens and other display apparatus.

Computer controlled presentation aids have also been introduced. Examples of these include systems employing the PowerPoint™ presentation software or Interlink Remotepoint RF presentation system.

If a computer controlled presentation aid is used for a presentation the presenter may use, for example, a laptop computer and the keyboard or mouse thereof to control the way how various images of the presentation are shown to the audience. The presenter may also draw the viewer's attention to a specific point of the image by means of a pointer device such as a simple stick like device or a laser or infra-red pointer The different pointers are known in the art and will thus not be explained in any more detail herein.

The prior art presentation systems may require the presenter to move forward and back to a specific location to be able to control the way how the illustrative material that associates with the presentation is shown to the audience. For example, the presenter may need to move next to a computer keyboard in order to be able to operate the computer.

The control features of the prior art presentation systems may be limited to such control features which only enable the presenter to select the slides he or she wishes to show and/or the order of presenting the slides. It might be advantageous in some instances if the presenter could be provided with more sophisticated control features. The inventor has also found that the prior art solutions may not allow the presenter to control the presentation by pointing a location or object on a displayed image by means of a handheld device.

SUMMARY OF THE INVENTION

Embodiments of the present invention aim to address one or several of the above problems.

According to one aspect of the present invention, there is provided a presentation system, comprising: presentation means for presenting images that associate with a presentation; pointer means for providing a pointer on an image presented by means of the presentation means; detector means for detecting the pointer and for determining the location of the pointer relative to the image; and control means adapted to provide at least one control function for the presentation based on information from the detector means.

In an embodiment the presentation means are integrated with a portable user device. According to an embodiment the detector means are integrated with a portable user device. According to a further embodiment control means may be integrated with a portable user device. The pointer means may also be integrated with the user device.

At least two entities of the system may be adapted for communication via a wireless interface. The portable user device may be adapted for wireless communication with at least one other station.

Said presentation means may be adapted to project images on a planar surface. Said presentation means may alternatively comprise means for controlling an image presentation device.

The pointer means may be adapted to provide a recognisable pattern on the image. The detector means are then adapted to detect said predefined pattern.

According to another aspect of the present invention there is provided a presentation method comprising: presenting an image that associates with a presentation; producing a pointer on the image; detecting the pointer from the image; determining the location of the pointer relative to the image; and controlling the presentation based on the determined location information.

According to another aspect of the present invention there is provided a user device for use by a presenter, comprising: presentation means for presenting images that associate with a presentation; detector means for detecting a pointer that has been provided on the image; determination means for determining the location of the pointer relative to the image; and control means adapted to provide at least one control function for the presentation based on information from the detector means.

The embodiments of the invention may provide a presentation system wherein the presenter may freely move relative to the screen or other display device and/or a device projecting or otherwise displaying the image and/or device used for controlling the presentation. The presenter may control the presentation simply by pointing the image by means of a pointer device. Some of the embodiments provide a portable control device providing the presenter with enhanced control features.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
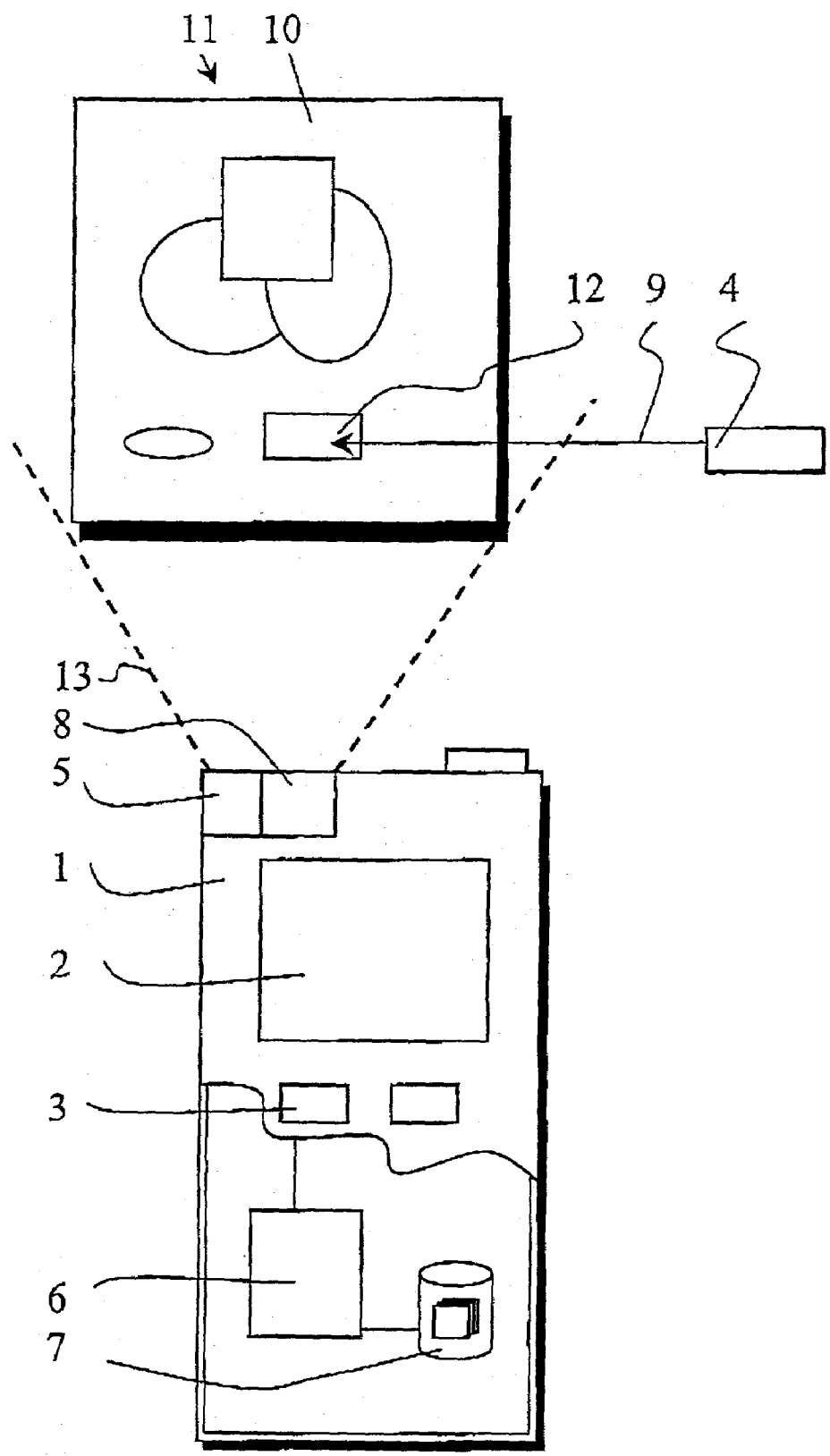
FIG. 1 shows one embodiment of the present invention.

Reference is first made to a schematic diagram of FIG. 1 showing an embodiment of the present invention. A planar screen 10 such as a canvas is shown to be used as a surface onto which various images associated with a presentation may be projected. It shall be appreciated that although the following description will refer to a screen, the images could be projected on any surface such as on a wall or ceiling. Appropriate alternative surfaces onto which images may be projected are well known in the art and will thus not be described in any more detail herein.

FIG. 1 shows a user device 1 that may be used by a presenter (not shown for clarity) when presenting images to an audience (not shown for clarity). More particularly, FIG. 1 is a partially sectioned view of a mobile station 1 that may be used in normal operation for communication over a wireless interface with another station.

The mobile station may comprise a mobile telephone or other portable device that may be used for voice or data communication by the user thereof. If the mobile station 1 subscribes to a cellular mobile communication network the mobile station 1 may communicate with a transceiver entity of the mobile communication network. These entities are known by the skilled person. Since these entities are not an essential part of the invention they not illustrated or described in any more detail. It is sufficient to note that the transceiver entity may comprise a base station (BTS) of the cellular system or any other appropriate element with which the mobile station may communicate with over a wireless interface.

The mobile user device 1 may be provided with user interface means comprising a display 2 and input means. The skilled person is familiar with different user interfaces of a mobile user equipment such as the mobile station 1 and therefore these will not be described in more detail herein. It is sufficient to note that the input means may be formed by control buttons 3 or they may include e.g. voice activation or touch screen means and so on.

The user device 1 is adapted for use for a presentation. According to a first embodiment the user device 1 may be used for displaying images that associate with a presentation by projecting the images on the screen 10. The user device 1 may be provided with build-in laser projector or other projector means 8. The basic principles of image projection are known by the skilled person as will thus not be explained in more detail herein.

The image presentation operations of the user equipment 1 may be controlled by means of a processor function 6. The images to be projected by the projector means 8 may be stored in a data storage means 7. The processor function 6 is adapted to process data that associates with the presentation and/or for controlling the presentation. The processor function 6 may be integrated with at least one other processor function of the mobile station 1 or may be adapted to process data that associates with presentations only. The data storage means 7 may also be either integrated with at least one other function of the mobile station 1 or be assigned solely for storage of data that associates with presentations. Separation of the presentation functions from other functions of the mobile user equipment 1 may be preferred e.g. for security or usability reasons.

The user device 1 may thus be adapted for provision of at least one control function that associates with the presentation. For example, the presenter may change the image to be presented to the next (or previous) one, enlarge or reduce (i.e. "zoom") the size of the image, select a part of the image to be highlighted, select a function by "clicking" an icon on the image, add an effect to the image and so on. The skilled person is aware of a great number of other possible control operations. However, for the reasons of clarity these will not be described in more detail herein.

The data processing facility 6 may be adapted to enable the presenter to control the presentation by means of a pointer device 4. The pointer device is a means that the presenter may held in this/hers hand and use for provision of a visible indicator on the image on the screen 10. The pointer device 4 may comprise e.g. a laser pointer, a infrared pointer or a similar pointer device. In FIG. 1 the pointing operation is illustrated by arrow 9 pointing to an object 12 of the image 11.

The pointer device 4 can be used by the presenter to point a selected location on the screen 10, as illustrated by the arrow 9. The selected location will be referred to in the following as an object. The term "object" shall be understood to refer to any location on the screen that the presenter has selected by pointing the location by the pointer device 4. The term object is thus indented to refer to any item on the screen or just to a location, even an "empty" location on the screen.

The pointer device 4 provides a pointer or an indicator mark on the image. The pointer is provided such-that that it can be detected by detection means 5 of the user device 1. The pointer will be referred to in the following by the term "spot". The arrangement is preferably such that the relative location of the spot on the displayed image 11 is determined based on information of the location of the image and information from the detection means 5. The presentation is then controlled based on the determined relative location.

The detection means may be provided with appropriate imaging means 5 such as camera means. The camera means can be used to track the location of the spot provided by means of the pointer device 4 relative to the image 11. The detection means may also be adapted to detect information associated with motion of the spot. The position information is input into the processor means 6 of the mobile user device 1. The position information may thus form control instruction input for the presentation control means.

Computer vision techniques or so called machine vision techniques may be used to find the projective mapping of the projected image 11 on the projection plane 10. The user device 1 may be adapted to project a calibration image to determine its relative location to the screen 10, e.g. on an appropriate co-ordinate system. The calibration image may comprise e.g. one or more predefined patterns based on which the device positions itself relative to the screen 10.

Once the projective mapping is found, the computer vision techniques may be used to locate e.g. the bright laser spot on the projected image 11. Projective mapping techniques may then be used to determine the relative position of the laser spot on the projected image. The mapping may also be used to find out the relative motion of the laser spot, if this is required.

The pointer device 4 is shown to point to a specific object 12 on the screen 10. The camera means 5 takes an image of the screen and detects that the pointing device 4 has provided a spot on the object 12. The imaging is indicated by dashed lines 13. Since the control entity of the system is aware that the object 12 is located on this location of the image, the control entity is capable of determining that the presenter is pointing to that object and that he or she has selected this object for a specific purpose. For example, the object 12 can be seen as an icon of a graphical user interface. By pointing the object e.g. for a predefined length of time the presenter "clicks" the icon.

The images associated with the presentation may be stored and fetched from the storage means of the user device. For example, the presenter may prepare a sequence of "slides" that are stored to and projected by the user device. The presenter may point a location on the image and thus on the screen. Based on information regarding the relative position between the user device and the screen on one hand and the image and the screen on the other hand, the user device may then determine the relative location between the pointer mark and the image. The presentation may then be controlled accordingly.

Figures 2, 3:
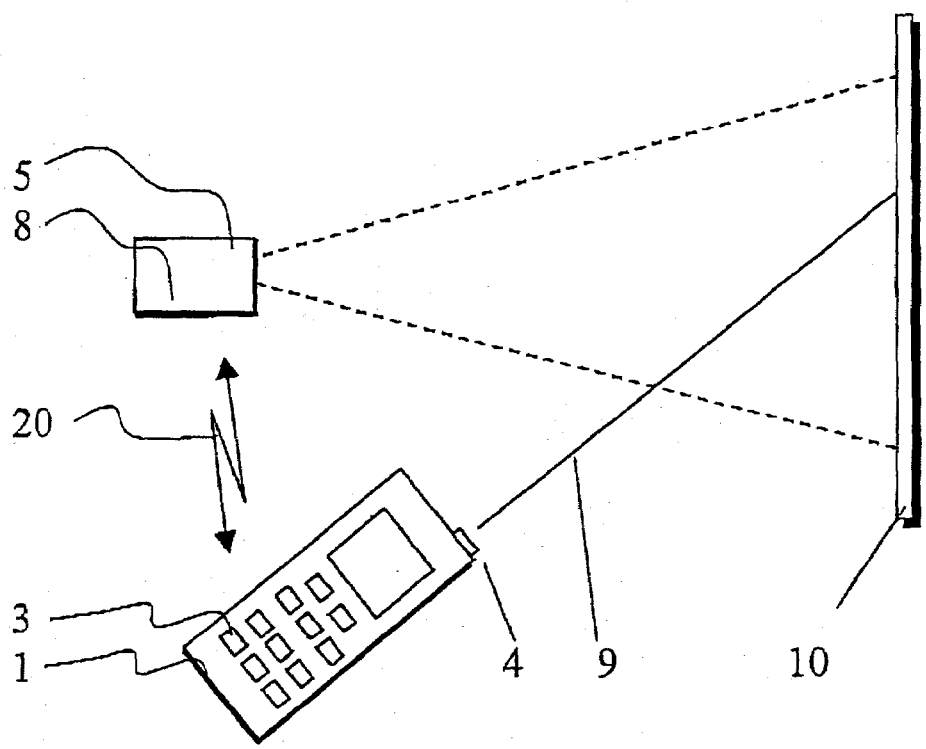
FIG. 2 shows another embodiment of the present invention.
FIG. 3 is a flowchart illustrating the operation of an embodiment of the present invention.

FIG. 2 shows another embodiment in which a handheld user device 1 is provided with an integrated pointer device 4. The user device 1 may comprise a mobile station as explained above. In this embodiment the projector means 8 and the detector means 5 are provided by a projector device that is separate from the user device 1 instead of being an integrated part of the user device.

The main difference between the embodiments of FIGS. 1 and 2 is that in the latter the presenter is provided with more advanced possibilities to control the presentation. In addition to just pointing a selected location on the screen 10 the presenter may give additional control instructions by means of the user device 1. The presenter may, for example, press a button 3 to indicate that he or she wants to select (that is, to "click") the object he/she is pointing at.

The presenter may also be provided with additional information by means of the user interface of the user device 1. For example, a display of the next image may be given on the display screen of the device 1, or the user may be provided with messages that are not show or reproduced to the audience.

The user device 1 may communicate with the other devices of the presentation system via a local link. For example, a short range radio link 20 such as the Bluetooth™ may be used for the communication. Another possibility is to use an infra-red link for the communication. An example of infra-red links is so called IRDA link as defined by the infra-red association.

FIG. 3 shows a possible operation in accordance with the present invention. In the first step an image projected on a screen of the presentation system. The image may be projected by means of the mobile station. Alternatively, the image is projected by an external projector such as by means of a VGA projector that is controlled by the mobile station, e.g. via a wireless interface.

The presenter selects an object from the display screen by pointing the object by the pointer device. The user may, for example, use a predefined flash pattern to indicate the desired control operation. For example, two flashes substantially in the same spot may indicate that the presenter wishes the next slide, three may indicate a request for the previous slide and so on.

A camera means is adapted to take images of the display. The existence and location of the pointer relative to the image is determined based on computer vision techniques. Based on the information provided by the determination the user may then control the presentation, such as instruct the system to present the next image.

The pointing device does not have to be necessarily a laser, infrared or other light emitting pointer device, but can be for example a tip of a sharp object such as a shadow of a pen or any other pointing device or any other feature the imaging means may recognise from the screen. This is illustrated by FIG. 4 wherein a tip of a shadow 15 of a pointer stick 14 is detected by appropriate detector means 5.

Figure 4:
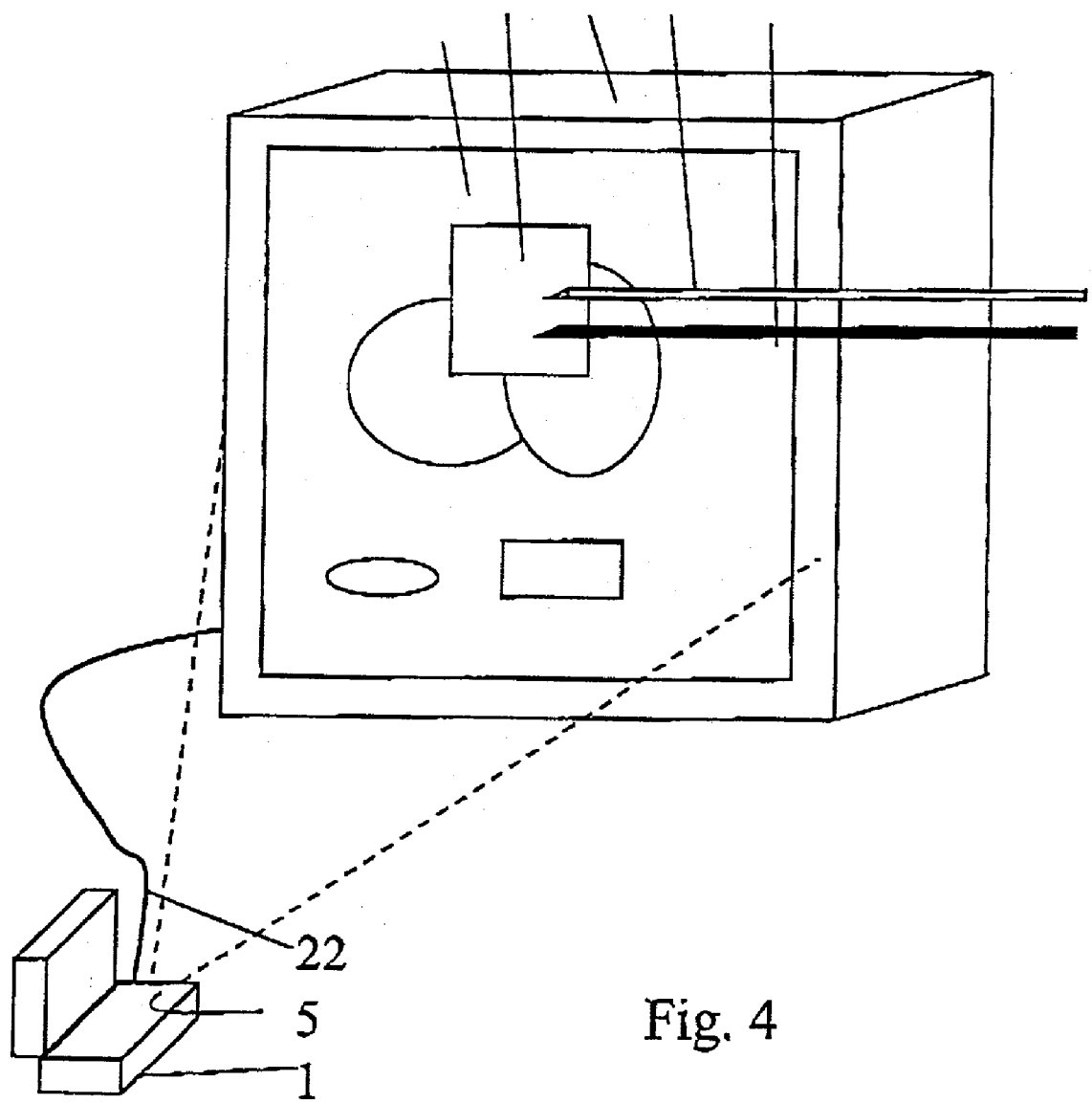
FIG. 4 shows some alternative features of the invention.

FIG. 4 also shows an embodiment wherein the images are provided by a display screen apparatus 10 and wherein the pointer mark is detected on the display screen.

The mobile station or other user device 1 may be provided with VGA connector 22 for connection between the user device 1 and the image presentation device 10.

Instead of a combined image presentation means (a projector or a display and so on) and imaging means 5, as shown in FIGS. 1 and 2, an imaging means 5 that is separated from the image presentation means may be used. In FIG. 4 a camera 5 is integrated with a portable data processing device 1. The imaging means may also be an separate from the image presentation apparatus and the user device. The user device and the imaging means may communicate based on any appropriate technique, such as the above referred local wireless links or protocols such a I-Link or Firewire and so on.

The imaging means may comprise more than one camera. The imaging means may comprise at least one scanning device.

According to a possibility the presenter may download images or other data to the user device from a data source via a wireless connection between the user device and a data communication network.

According to a possibility various persons are enabled to give control instructions. In a simple implementation at least two persons provide pointers on the image, for example by means of a number of laser pointer devices and/or sticks. According to an embodiment the pointers provide each different colours and/or patterns on the image.

The multipointer operation could be useful e.g. in brainstorming meetings or the like. One of the persons attending the meeting may act as the "chairman". In accordance with an embodiment the chairman is provided with the FIG. 2 type pointer device while the others may use less sophisticated pointer devices.

The user can control the flow of the presentation from distance. The user does not need to walk back and forth to a control device and/or to the projector, but instead he or she may use either a simple pointer device or the handheld user device for the control operations. The "laser gestures" can be used to give shortcuts like "next slide", "activate hotspot", "activate a sound effect" and so on. The user may instruct the presentation system to play a video clip, to control presentation of animations (e.g. star and pause the presentation), zoom a map in or out from the image, change the view of a CAD-model and so on.

It should be appreciated that whilst embodiments of the present invention have been described in relation to mobile user devices such as mobile stations, embodiments of the present invention are applicable to any other suitable type of devices. It shall be appreciated that the user device does not necessarily need to be enabled for communication with other entities.

It is also noted herein that while the above describes exemplifying embodiments of the invention, there are several variations and modifications which may be made to the disclosed solution without departing from the scope of the present invention as defined in the appended claims.

The invention claimed is:

1. A handheld portable user device for use by a presenter, comprising:
    presentation means for presenting images that associate with a presentation;
    detector means for detecting a pointer that has been provided on the image;
    determination means for determining the location of the pointer relative to the image; and control means adapted to provide at least one control function for the presentation based on information from the detector means.

2. A handheld portable user device according to claim 1, which is a mobile telephone.

3. A presentation system, comprising:
a handheld portable user device comprising a presentation means for presenting images that associate with a presentation;
pointer means for providing a pointer on an image presented by means of the presentation means;
detector means for detecting the pointer and for determining the location of the pointer relative to the image; and
control means adapted to provide at least one control function for the presentation based on information from the detector means.

4. A system as claimed in claim 3, wherein the handheld portable user device further comprises the detector means.

5. A system as claimed in claim 3, wherein the handheld portable user device further comprises control means.

6. A system as claimed in claim 3, wherein the handheld portable user device is adapted for wireless communication with at least one other station.

7. A system as claimed in claim 3, wherein said presentation means are adapted to project images on a planar surface.

8. A system as claimed in claim 3, wherein said presentation means comprises means for controlling an image presentation device.

9. A system as claimed in claim 3, wherein at least two entities of the system are adapted for communication via a wireless interface.

10. A system as claimed in claim 9, wherein the wireless interface is based on a short range radio link protocol or an infrared protocol.

11. A system as claimed in claim 3, wherein the images are projected by means of a laser projector.

12. A system as claimed in claim 3, wherein the images are presented by means of a display device.

13. A system as claimed in claim 3, wherein the pointer means is adapted to provide a recognizable pattern on the image.

14. A system as claimed in claim 13, wherein the detector means are adapted to detect said recognizable pattern.

15. A system as claimed in claim 3, wherein the pointer means comprise a laser pointer.

16. A system as claimed in claim 3, wherein the pointer means comprise a tipped element.

17. A system as claimed in claim 3, wherein the detector means comprises imaging means.

18. A system as claim in claim 17, wherein the imaging means comprise at least one camera.

19. A system as claimed in claim 17, wherein the imaging means comprise at lease one scanning device.

20. A system as claimed in claim 17, wherein the imaging means is adapted to track the location of the pointer provided by the pointer means.

21. A system as claimed in claim 17, wherein the imaging means is adapted to track motion of the pointer on the image.

22. A system as claimed in claim 3, wherein the detector means are adapted to detecting pointers provided by a plurality of pointer means.

23. A system as claimed in claim 22, wherein at least two pointer means provide a different pointer on the image.

24. A system as claimed in claim 3, wherein the user device comprises transceiver means for communication with a communication network.

25. A system as claimed in claim 24, wherein the communication means provide a wireless communication interface between the user device and a cellular network.

26. A presentation system according to claim 3, wherein the handheld portable user device is a mobile telephone.

27. A presentation method comprising:
presenting an image that associates with a presentation by means of a handheld portable user device comprising a presentation means;
producing a pointer on the image;
detecting the pointer from the image;
determining the location of the pointer relative to the image; and
controlling the presentation based on the determined location information.

28. A presentation method according to claim 27, wherein the handheld portable user device is a mobile telephone.

* * * * *